United States Patent [19]

Dowling

[11] 4,235,081
[45] Nov. 25, 1980

[54] COMPRESSED AIR DRYER

[75] Inventor: Ralph O. Dowling, Zelienople, Pa.

[73] Assignee: Kellogg-American, Inc., Oakmont, Pa.

[21] Appl. No.: 956,290

[22] Filed: Oct. 31, 1978

Related U.S. Application Data

[63] Continuation-in-part of Ser. No. 840,574, Oct. 11, 1977, abandoned.

[51] Int. Cl.³ ............... F25D 17/06; F25D 21/00; F28F 1/30
[52] U.S. Cl. ........................... 62/93; 62/272; 165/182
[58] Field of Search ............... 62/93, 272; 165/179, 165/180, 182; 55/62, DIG. 17

[56] References Cited

U.S. PATENT DOCUMENTS

| | | | |
|---|---|---|---|
| 1,854,278 | 4/1932 | Smith | 165/182 |
| 1,893,270 | 1/1933 | Caldwell | 165/182 |
| 2,955,673 | 10/1960 | Kennedy et al. | 183/4.1 |
| 3,225,517 | 12/1965 | Wachsmuth | 55/31 |
| 3,247,681 | 4/1966 | Hankison et al. | 62/317 |
| 3,596,474 | 8/1971 | Bloxham et al. | 62/93 |
| 3,861,165 | 1/1975 | Hirano | 62/93 |
| 3,896,633 | 7/1975 | Moore | 62/272 |
| 3,899,023 | 8/1975 | Zander et al. | 62/272 |
| 3,963,466 | 6/1976 | Hynes | 62/272 |
| 4,027,729 | 6/1977 | Bruhl | 62/93 |

Primary Examiner—Lloyd L. King
Attorney, Agent, or Firm—Buell, Blenko & Ziesenheim

[57] ABSTRACT

An improved compressed air dryer unit having an air-to-air heat exchanger and an air-to-refrigerant heat exchanger separately mounted on a common base plate and connected in series for air flow therethrough in succession. Each exchanger comprises a tubular housing containing a bundle of tubing disposed longitudinally in the housing and extending through holes in a stack of closely spaced parallel sheet metal fins substantially coextensive in area with the cross-sectional area of the chamber in the housing. Longitudinally spaced baffles on the interior walls of the housing direct the flow of air therethrough in a succession of oppositely directed passes around and between the fin sheets. Water vapor, oils and particulates are deposited on the fin sheets and flow due to gravity to the bottom of the housing producing a self-cleaning function on the fin sheets. Water collected in the housing is removed via drain tubes controlled by automatic drain valves. Separate water separators are not required but may be used if desired.

8 Claims, 9 Drawing Figures

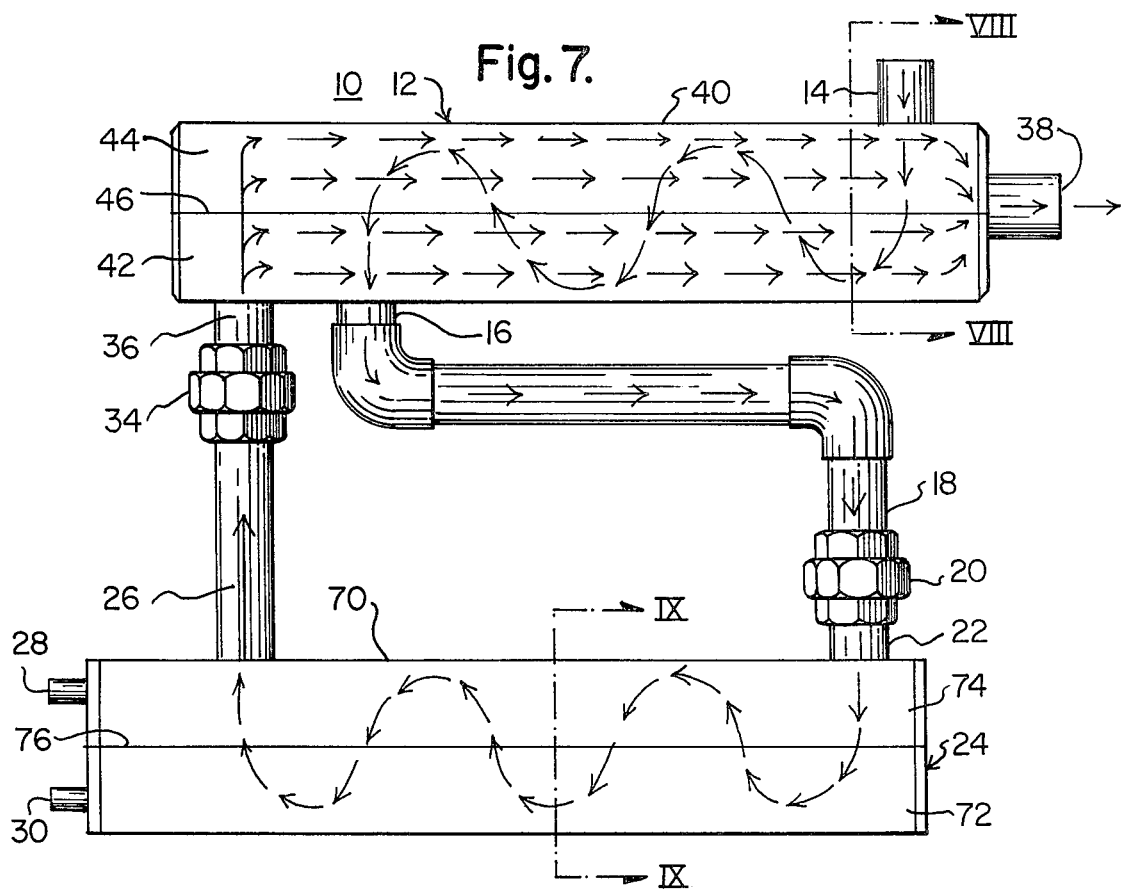
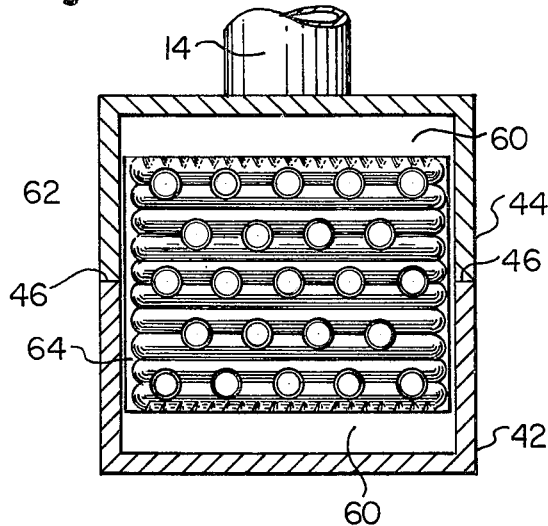
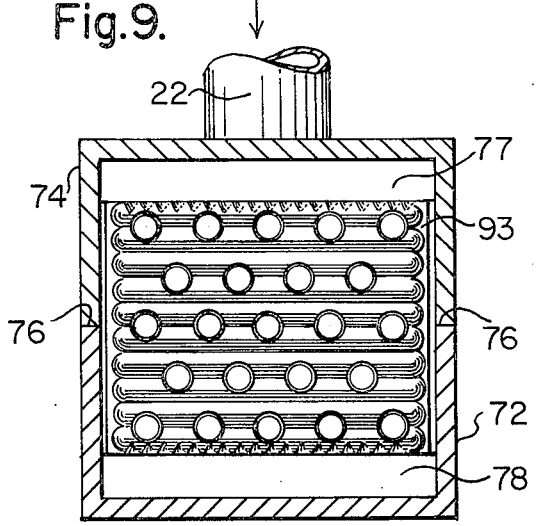

COMPRESSED AIR DRYER

This application is a continuation-in-part of my prior copending application Ser. No. 840,574, filed Oct. 11, 1977, now abandoned.

This invention relates to air dryers which are useful for dehumidifying compressed air by regenerative and refrigerative cooling.

In such air dryers atmospheric air is commonly compressed to about 100 to 200 psig. and to temperatures of about 100° F., directed through a dryer and then provided to a high air pressure system. Mechanical refrigeration is commonly used to cool the air down to a dew point of about 38° F. For example, Wachsmuth U.S. Pat. No. 3,255,517, issued Dec. 28, 1965, schematically illustrates in FIG. 2 a system in which hot moist air from a compressor flows through one side of air-to-air heat exchangers, through one side of an air-to-refrigerant heat exchanger and then back through the second side of the air-to-air heat exchangers before being directed into a header. Water separators are used in the system to dispose of the condensed water. I have formerly utilized such a system wherein the air-to-air exchanger comprised a double pipe design and the air-to-refrigerant exchanger comprised tubes having integral splines within a larger diameter tube.

It is an object of my present invention to provide an air dryer unit, having heat exchangers of improved design, which enables said unit to be of relatively small size and to operate more economically than heretofore known driers through conservation of electrical energy and to dispense with water separators as such.

More particularly, I provide an improved air dryer unit wherein the heat exchangers comprise bundles of tubing extending through holes in stacks of closely spaced sheet metal fin sheets substantially coextensive in area to that of the interior of the exchanger housing. The fin sheets are designed, as by providing rippled edges and corrugated sheets, to increase the turbulence of the air and of the liquid flow of the water condensed thereon thereby to wash the surface of the fins and prevent fouling thereof by entrained oils and solid particles. Baffles on the interior walls of the exchanger housing direct the flow of air through the exchanger in a succession of oppositely directed passes between groups of fin sheets.

With the heat exchangers constructed in accordance with my invention, the use of water separators within or outside the exchangers is unnecessary though they may be used optionally.

In the foregoing general description, I have set out certain objects, purposes and advantages of my invention. Other objects, purposes and advantages of the invention will be apparent from a consideration of the following description of a presently preferred embodiment, shown in the accompanying drawings, in which:

FIG. 7 is a view of a modification of the air dryer systems of FIG. 1 representative of a preferred embodiment of my invention in which the water separator between the heat exchangers is not used;

FIG. 8 is a sectional view of the air-to-air heat exchanger taken along the line VIII—VIII of FIG. 7, on enlarged scale; and FIG. 9 is a sectional view of the air-to- refrigerant heat exchanger taken along the line IX—IX of FIG. 7, on enlarged scale.

Figure 1:
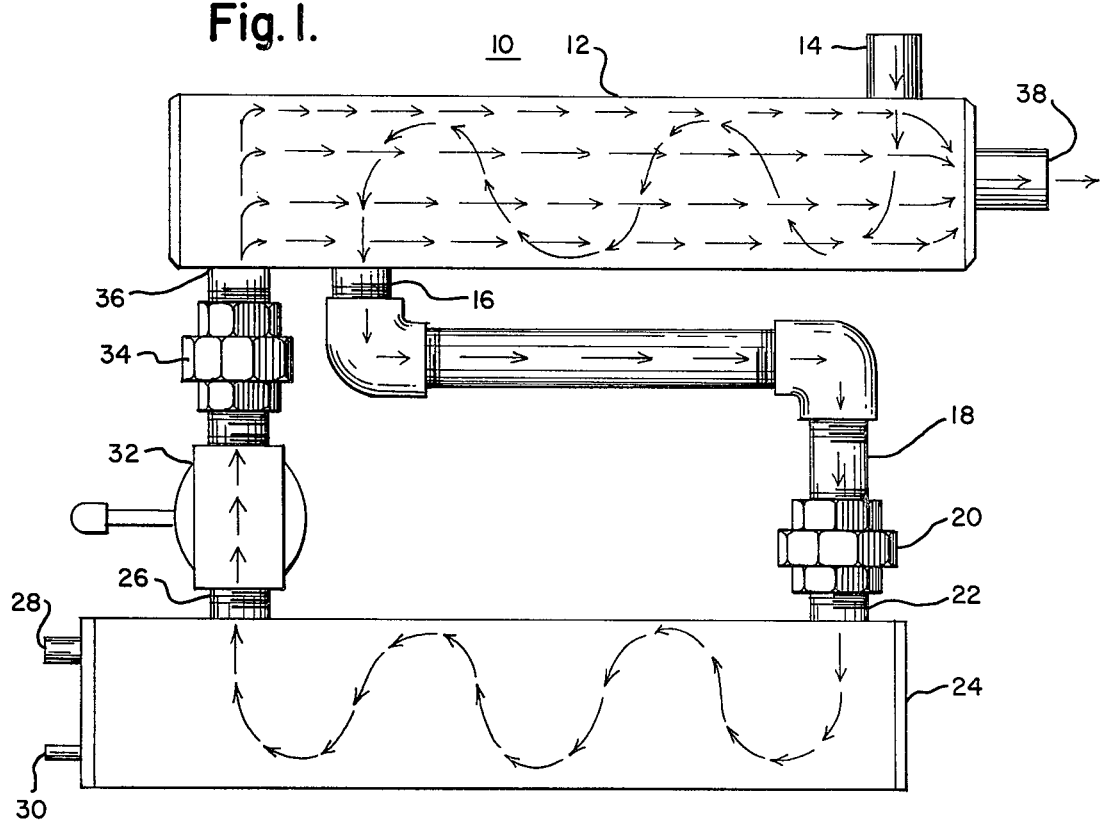
FIG. 1 is a schematic plan view of an air dryer system showing the gas flow in which my invention may be most advantageously employed.

Referring generally to FIG. 1, an air dryer system 10 comprises an air-to-air heat exchanger 12 for receiving hot moist air at nozzle 14 at high pressures of 100 to 200 psig. from an air compressor (not shown) and at temperatures of about 100° F. The hot moist air flows through the shell side of the exchanger 12 and is guided by advantageously spaced baffles in a predetermined path over a tube bundle 56 comprising a single serpentine tube 62 (shown in FIG. 3) or a plurality of single tubes 62 as described below. After a plurality of passes, for example, five as illustrated here, the gases exit from air-to-air exchanger 12 through exit nozzle 16 and flow through a horizontally disposed pipe 18 that is connected by a union 20 to inlet nozzle connection 22 of the shell size of the air-to-refrigerant heat exchanger 24. The air flows over the shell side surfaces of the air-to-refrigerant heat exchanger 24 in a plurality of passes, six as depicted here, and exits through a nozzle 26. A suitable refrigerant, commonly a freon fluid such as R 12 or R 22 at about 30° F., is supplied by a conventional refrigeration compressor (not shown) and flows into a serpentine tube of the air-to-refrigerant heat exchanger 24 through inlet 30 as a liquid and flows from the exchanger 24 through outlet 28 as a gas. This arrangement causes the liquid refrigerant to flow up from the bottom of the evaporator tube coil to the top, thus insuring a flooded condition inside the evaporator coil for maximum heat transfer. Such a refrigerant cools the compressed air stream to a temperature of from about 35 to 38° F. by absorbing the sensible heat to vaporize the refrigerant. The cold compressed gases then flow through a centrifugal separator 32 where entrained liquid or solid particles are separated from the gas stream. The cold cleaned gas then flows via centrifugal separator 32 and union 34 and in through nozzle 36 on the tube side of the air-to-air heat exchanger 12. The dehumidified cold gases flow through the tube or tubes 62 of the exchanger 12 to recover a large portion of energy lost by cooling the hot moist gases, and then exit the heat exchanger 12 through nozzle 38 into the compressed air system at a temperature of approximately 75° F.

Due to the high efficiency of the air-to-air heat exchanger 12, water is condensed inside the shell of the exchanger 12 but to a lesser degree than in the exchanger 24. It will be seen, however, that the water condensed in the air-to-air heat exchanger 12 reduces the latent heat load of the air-to-refrigerant heat exchanger 24, thus resulting in a greater efficiency of the latter.

While I have shown a water separator 32 in the air dryer unit depicted in FIG. 1, I prefer to use a modified air dryer unit in which the water separator 32 is not used, as shown in the modified unit of FIG. 7. Corresponding elements in the two figures are designated by the same reference numerals without any further description, though the numbers and spacing of the pipes or tubes in the exchangers of FIG. 7 differ from that of FIG. 1. It will be noted that the tubes in successive rows in FIG. 7 are staggered vertically to insure diversion of flow of air around the tubes.

In actuality I have found that the use of a water separator, such as separator 32, in my air dryer unit serves only as a back-up unit and its use is entirely optional. As will be explained more fully later on, I have found that my air dryer unit functions effectively to remove the moisture from the air without an intervening water separator.

Figure 2:
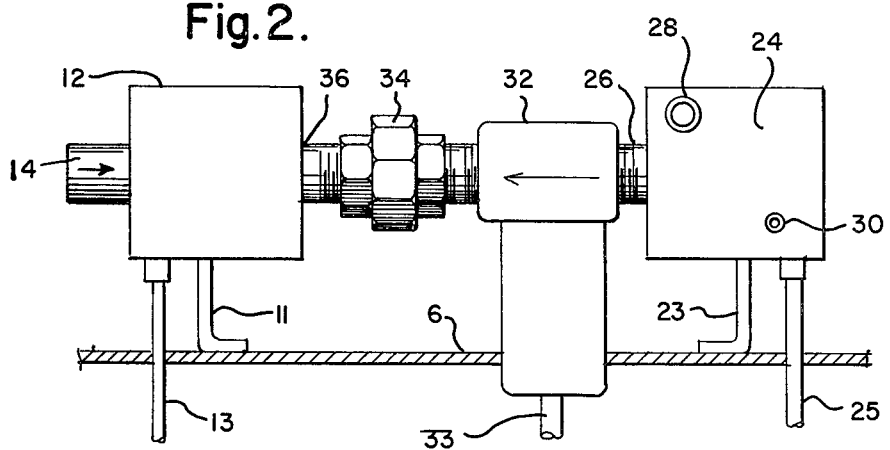
FIG. 2 is an end view of the air dryer system.

Referring to FIG. 2, the heat exchangers 12 and 24 have condensate drain lines 13 and 25, respectively, and the centrifugal separator 32 has a condensate drain line 33 through which the condensate flows to an automatic drain valve (not shown). The automatic drain valve intermittently discharges the condensate to a drain open to the atmosphere, such as a floor drain, sump or the like. Optionally, the drain lines 13 and 25 may be connected directly to the automatic drain valve.

As can be most clearly seen in FIG. 2, the heat exchangers 12 and 24 are mounted on a base 6 by pedestals 11 and 23, respectively, so that air dryer 10 can be used as a unit. I prefer to place exchangers 12 and 24 horizontally and to provide horizontal interconnecting piping so that either one or both of the exchangers 12 and 24 may be easily dismantled from the base 6 by disconnecting unions 20 and 34 and pedestals 11 and 23. Although not shown, the condensate lines 13, 25 and 33 have unions. Such an arrangement is practical only because of the new design of the heat exchangers 12 and 24.

Figure 3:
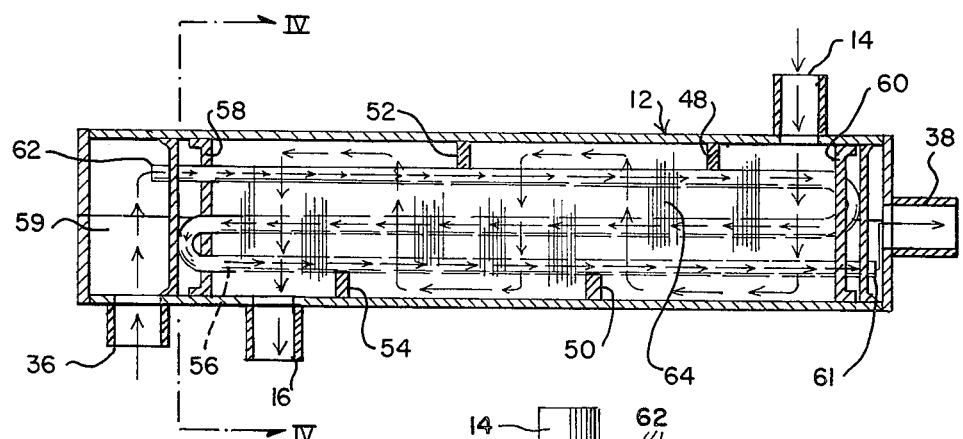
FIG. 3 is a schematic plan view of the internals of the air-to-air heat exchanger illustrated in FIG. 1.
Figure 4:
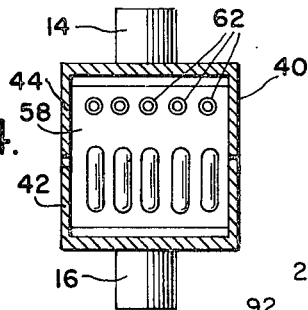
FIG. 4 is a sectional view of the heat exchanger of FIG. 3 taken along the line IV—IV.

The structure of the air-to-air heat exchanger 12 is most clearly seen in FIGS. 3, 4 and 8. A steel shell 40, of a square or rectangular shape, is formed by two halves 42 and 44. The halves are identically formed from cold rolled steel and are joined by longitudinal weld seams 46. Steel baffles 48, 50, 52 and 54 are welded to each shell half 42 and 44 prior to assembly of the shell halves. The baffles engage the fin sheets on one side or the opposite side and are so longitudinally spaced as to direct the air flow through the shell 40 in a desired number of oppositely directed passes, between the entrance nozzle 14 and the exit nozzle 16. The shell 40 is designed to closely surround the finned tube bundle 56 and intermediate end plates 58 and 60. The intermediate end plates 58 and 60 are sealed to the steel shell 40 as by weldment, thereby providing end chambers 59 and 61, respectively. The tube bundle 56 is comprised of a stack of closely spaced aluminum fin sheets 64 having holes through which a plurality of serpentine or straight tubes 62 extend with a tight metal-to-metal fit. The tubes 62 are preferably copper and one end is open to chamber 59, and the other end is open to chamber 61. The tubes 62 are supported at their opposite ends by the end plates 58 and 60, respectively. I prefer to closely space the aluminum fin sheets 64 providing, for example, eight per lineal inch of tube 62. The fin sheets 64 may be formed with projecting collars surrounding the holes therein to provide tight contact with the tubes and serve as spacers between the fin sheets.

The total area of the fin sheets 64 in relation to that of the exposed area of the tubes 62 is relatively high, being of the order of 14 to 1, thus making for high efficiency of heat exchange.

As will be seen in FIG. 8, the fin sheets 64 have a slight clearance with the walls of the housing or shell 40 along one pair of opposite edges. The other pair of opposite edges are spaced from the wall of the shell 40 and are engaged only by the inner edges of baffles 48, 50, 51 and 52 which direct flow of air around and between the fin sheets. The side edges of the fin sheets engaged by baffles are preferably rippled and the fin sheets are corrugated vertically, that is transversely to flow of air, to provide turbulence to the flow of air between the fin sheets. The corrugations also provide grooves in which condensed water may flow across the fin sheets to the bottom of the housing shell. Thus, the condensed water, in traveling downwardly across the fin sheets, serves to wash or clean the fin sheets and to prevent fouling thereof.

Figure 6:
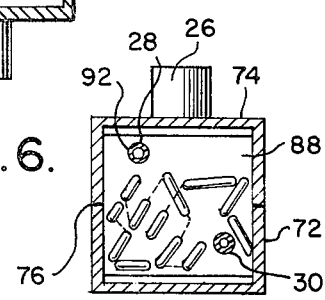
FIG. 6 is a sectional view of the heat exchanger of FIG. 5 taken along the line VI—VI. The apparatus is schematically shown inasmuch as the specific design of such details as tube sheet layouts, baffle layouts, nozzle configurations, shell specifications and the like are determined by standards of the TEMA, ASME and similar organizations and are therefore well known in the art.
Figure 5:
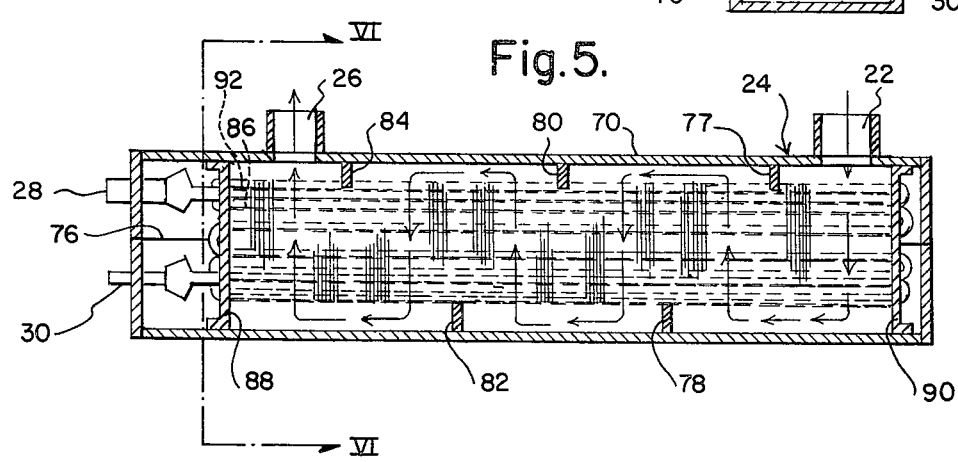
FIG. 5 is a schematic plan view of the internals of the air-to-refrigerant heat exchanger illustrated in FIG. 1.

The structure of the air-to-refrigerant heat exchanger 24 is most clearly seen in FIGS. 5, 6 and 9. A steel shell 70, of a square or rectangular e shape, is formed by two halves 72 and 74. The halves are identically formed from cold rolled steel and are joined by longitudinal weld seams 76. Steel baffles 77, 78, 80, 82 and 84 are welded to the side walls of each shell half 72 and 74 prior to assembly of the halves. The baffles guide the air flow through a plurality of passes around and through the tube bundle 86. The shell 70 is designed to closely surround the fins of tube bundle 86 and intermediate end plates 88 and 90. The intermediate end plates 88 and 90 need not be welded and are allowed to float under the relatively large temperature differentials which exist and change within the heat exchanger 24. For example, the refrigerant is controlled at about 30° F. and the compressed air temperature varies from about 75° F. to 35° F. The tube bundle 86 may be comprised of one continuous serpentine tube 92, or several parallel-connected serpentine tubes, extending between and supported at opposite ends on the intermediate headers 88 and 90. The serpentine tube 92, preferably of copper, extend through holes in a stack of closely spaced fin sheets 93 of aluminum between the headers 88 and 90, which sheets are preferably spaced ten per lineal inch. The holes in the fin sheets 93 are of a diameter providing a close fit and tight contact with the tubes 92. Two opposite edges of the fin sheets 93 are engaged by the baffles 77–84 and are rippled. Moreover, the fin sheets are corrugated vertically that is at a right angle to the rippled edges, as are the fin sheets 64 of exchanger 12 for the same purpose. The water condensing on the fin sheets flows down in the grooves formed by the corrugations and falls to the bottom of the shell 70 from which it drains to the (usually one-half inch diameter) condensate drain line 25 (FIG. 2).

Preferably the air dryer 10, illustrated in FIGS. 1 and 7, is sprayed with at least an inch of cellular urethane foam insulation to minimize cold losses from the drier to the ambient air.

Thus, an air dryer system embodying my invention, as explained heretofore, will cool and dehumidify compressed air through the use of closely spaced stacks of rippled and corrugated fin surfaces surrounding the tube surfaces and utilize water condensing on said fin surfaces to perform a cleaning function and prevent fouling.

While I have shown and described a presently preferred embodiment of the invention, it is to be distinctly understood that the invention is not limited thereto but may be otherwise variously embodied within the scope of the following claims.

I claim:

1. In a compressed air dryer of the type wherein hot moist air flows from a compressor through an air- to-air heat exchanger to an air-to-refrigerant heat exchanger and then back through the air-to-air heat exchanger to dehumidify the air, the improvement wherein each of said heat exchangers comprises a sealed shell formed of substantially identical half-sections joined along their longitudinal edges having therein respective tube bundles, said tube bundles comprising a plurality of closely spaced parallel extending sheet metal fins having holes therein through which the tubes extend longitudinally within said shells, said air-to-air heat exchanger having sealed end chambers at opposite ends thereof into which the tubes of the corresponding tube bundle open, an intermediate chamber provided with an entrance port at one end by which moist compressed air is supplied thereto and an exit port adjacent the opposite end via which the air leaves said intermediate chamber, and baffles on the interior of said shell half- sections for directing the flow of air therethrough in a plurality of oppositely directed passes, said air-to-refrigerant heat exchanger having an entrance port adjacent one end that is connected to the exit port of the air-to-air heat exchanger and an exit port adjacent the opposite end that is connected to one of the sealed end chambers of the air-to-air heat exchanger, and baffles on the interior of said shell half-sections for directing the flow of air in a plurality of oppositely directed passes over the tube bundle of said air- to-refrigerant exchanger, the air from the air-to-refrigerant heat exchanger flowing via the said one sealed end chamber through the tubes of the tube bundle of said air-to-air heat exchanger and exiting via the opposite one of said sealed end chambers, condensed moisture which collects on the fins of said tube bundles falling by gravity to the bottom of said shells, and drainpipe means for draining the moisture from said shells.

2. A compressed air dryer according to claim 1, wherein the successive rows of tubes in said tube bundles are in staggered relation and the sheet metal fins of said heat exchangers are corrugated in a direction transversely of air flow between the fins and are in a closely spaced relation of the order of eight to ten per lineal inch of the tubes.

3. The method of operating a compressed air dryer of the type wherein hot moist gas from a compressor flows through an air-to-air heat exchanger to an air-to-refrigerant exchanger and then back through the air-to-air heat exchanger to dehumidfy the air, wherein the improvement comprises flowing the hot moist gas progressively in a series of oppositely directed passes between groups of closely spaced corrugated sheet metal fin elements forming part of the tube bundles in the air-to-air exchanger and then in a series of oppositely directed pases between groups of closely spaced corrugated sheet metal fin elements forming part of the refrigerating tube bundles of said air-to-refrigerant exchanger to capture oil and solid particles and so that the water condensing thereon washes the fin elements, the water collecting on said sheet metal fin elements obviating separators or absorbent material for removing water from the outflow of air from said first heat exchanger.

4. In a compressed air dryer of the type wherein hot moist air flows from the compressor through an air-to-air heat exchanger to an air-to-refrigerant heat exchanger and then back through the air-to-air exchanger to dehumidfy the air, the improvement wherein the air-to-air heat exchanger comprises a first tubular housing having sealed end chambers and an intermdeiate chamber separated therefrom, a plurality of pipes supported longitudinally in said intermediate chamber and having their opposite ends open respectively to said end chambers, said first housing having an entrance port and an exit port for compressed air in said housing at opposite ends respectively of said intermediate chamber, baffle means on the interior of said first housing to guide the flow of air through the intermediate chamber of said housing from said entrance port to said exit port in a plurality of successive oppositely directed passes, wherein said air-to-refrigerant heat exchanger comprises a second tubular housing, a serpentine refrigeration pipe disposed longitudinally within said second tubular housing, through which a refrigerant medium flows, said second housing having an entrance port for air at one end and an exit port for air at the opposite end thereof, wherein conduit means connects the exit port of the first said housing to the entrance port of said second housing, said second housing having baffle means on the interior thereof to guide the flow of air in successive oppositely directed passes over and around said refrigeration pipe, from the entrance port to the exit port of said second housing, and wherein conduit means connects the exit port of said second housing to one of the sealed end chambers of the said first housing thereby to cause refrigerated dried air to flow through said plurality of pipes therein for initial cooling of air flowing through said first housing.

5. A compressed air dryer according to claim 4 wherein said housings are substantially rectangular in cross- section and wherein a plurality of parallel-extending closely spaced sheet metal fins of rectangular shape substantially fill the interior of the said first tubular housing and said second tubular housing, said sheet metal fins having holes therein through which the said plurality of pipes and serpentine pipes extend in tight-fitting contact, the flow of air in the said successive oppositely directed passes being between said fins and at a relatively low velocity to cause condensation of moisture from the air upon both sides of said fins from which the moisture flows by gravity vertically down along the fins to the bottom of said housings, the flow of moisture on said fins thereby providing an inherent cleaning action on said fins.

6. A compressed air dryer according to claim 5, wherein said rectangular sheet metal fins are corrugated in one direction and one pair of opposite edges respectively engaged by said baffle means are rippled so that the flow of air in the said successive oppositely directed passes between said fins is made turbulent though at a relatively low velocity to cause condensation of moisture from the air upon both sides of said fins from which the moisture flows by gravity vertically down along the corrugations in the fins to the bottom of said housings, the flow of moisture on said fins thereby providing an inherent cleaning action on said fins.

7. A compressed air dryer according to claim 4, wherein a common base plate is provided and wherein the said tubular housings constituting said exchangers are mounted horizontally in spaced parallel relation on said common base plate, and wherein the said conduit means connecting the housings are provided with separable couplings to enable separate removal of the individual housings from the assembly.

8. A compressed air dryer according to claim 7 wherein a separate drain pipe is provided for each of said housings, said drain pipes extending through said base plate and each having a separable coupling therein to enable removal of the corresponding housing from the base plate.

* * * * *

UNITED STATES PATENT AND TRADEMARK OFFICE
CERTIFICATE OF CORRECTION

PATENT NO. : 4,235,081
DATED : November 25, 1980
INVENTOR(S) : RALPH O. DOWLING

It is certified that error appears in the above-identified patent and that said Letters Patent are hereby corrected as shown below:

Column 4, line 23, after "rectangular", the letter "e" should be deleted.

Claim 3, column 5, line 61, "pases" should read --passes--.

Claim 4, column 6, line 5, "dehumidfy" should read --dehumidify--.

Claim 4, column 6, line 7, "intermdeiate" should read --intermediate--.

Signed and Sealed this

Third Day of March 1981

[SEAL]

Attest:

RENE D. TEGTMEYER

Attesting Officer     Acting Commissioner of Patents and Trademarks